United States Patent [19]

Jones

[11] Patent Number: 5,520,355
[45] Date of Patent: May 28, 1996

[54] THREE WING CIRCULAR PLANFORM BODY

[76] Inventor: Jack M. Jones, 872 Jim Starr Rd., Newnan, Ga. 30263

[21] Appl. No.: 356,781

[22] Filed: Dec. 12, 1994

Related U.S. Application Data

[63] Continuation of Ser. No. 123,286, Sep. 16, 1993, abandoned.

[51] Int. Cl.$^6$ .................................................. B64C 39/06
[52] U.S. Cl. ........................................... 244/13; 244/45 R
[58] Field of Search ............................... 244/12.1, 12.2, 244/13, 23 C, 35 R, 45 R, 34 A

[56] References Cited

U.S. PATENT DOCUMENTS

| | | |
|---|---|---|
| 1,523,994 | 3/1925 | Myers . |
| 2,472,763 | 6/1949 | Rodeck .................... 244/13 |
| 2,843,339 | 7/1958 | Strieb ..................... 244/12.2 |
| 2,876,964 | 3/1959 | Strieb ..................... 244/12.2 |
| 3,017,139 | 1/1962 | Binder .................... 244/34 A |
| 3,253,805 | 1/1966 | Taylor .................... 244/12 |
| 3,871,602 | 4/1975 | Kissinger ................. 244/13 |
| 3,981,460 | 9/1976 | Ratony .................. 244/45 R X |
| 4,053,125 | 10/1977 | Ratony .................. 244/45 R X |
| 4,856,736 | 8/1989 | Adkins et al. ............ 244/45 R |

FOREIGN PATENT DOCUMENTS

| | | | |
|---|---|---|---|
| 1444868 | 5/1966 | France ..................... 244/12.2 |
| 2718178 | 11/1978 | Germany ................. 244/12.2 |
| 1331655 | 9/1973 | United Kingdom ........ 244/12.2 |

*Primary Examiner*—Galen L. Barefoot

[57] ABSTRACT

An improved circular planform wing generally comprised of three different shaped wing sections which combine to form a peripherally circular planform body with a substantial central opening as determined by the wing sections interior trailing and leading edges. Twin vertical stabilizers, being parallel and substantially longitudinal in form, extend across the central opening about the longitudinal axis while being generally bisected by the common horizontal plane of the circular planform body. The vertical stabilizers are connected to the forward and aft sections of the circular planform body with a pusher propeller centrally positioned between the vertical stabilizers about the forward edge of the central opening. The propeller is connected forwardly to a power source which is connected to a cockpit and the forward areas of the circular planform body. Control surfaces are generally located about all interior and exterior trailing edges and can be further characterized as a low aspect ratio vehicle.

20 Claims, 4 Drawing Sheets

THREE WING CIRCULAR PLANFORM BODY

This application is a continuation of U.S. Ser. No. 08/123,286, filed Sep. 16, 1993, now abandoned.

BACKGROUND OF THE INVENTION

This invention relates to fixed wing aircraft, more specifically, to aircraft classified as heavier than air and requiring a forward linear movement of the wing to achieve lift, having wings that extend both laterally and longitudinally with a central opening located within the wing and positioned along longitudinally central lines. U.S. Pat. No. 3,871,602 to Kissinger (1975) discloses such a lifting body. The primary disadvantage of this design is that it is inherently unstable at slow speeds and requires a significant amount of weight about the leading edge to maintain a controllable center of gravity during flight. These disadvantages are eliminated by removing the central portions of the lifting body.

OBJECTS AND ADVANTAGES

The general object of my invention is to provide a forward biased, peripherally circular planform body comprised primarily of three different wing sections which, in the preferred embodiment, combine to form a circular wing body with a central opening as determined by the wing sections exterior and interior edges. Further objects and advantages of my invention are:

(a) an aircraft characterized as a low aspect ratio vehicle;

(b) an aircraft that resists the tendency to stall at slow speeds;

(c) an aircraft capable of high angles of descent at very slow speeds while maintaining lateral and directional control;

(d) an aircraft that is stable and maneuverable at high speeds;

(e) an aircraft capable of taking off and landing on short runways;

(f) an aircraft whereby a continuous wing structure allows for the lifting forces upon the wing to be distributed with greater uniformity with proximity to the aircraft's center of gravity;

(g) an aircraft whereby the inherent structural qualities of a circular wing allow for lighter construction techniques;

(h) an aircraft having a pair of parallel vertical stabilizers connecting the fore and aft sections which increases the circular wings structural efficiency;

(i) an aircraft with reduced noise levels within the cockpit;

(j) an aircraft capable of performing a full range of acrobatic maneuvers; and (k) an aircraft that is safer while ground steering.

DRAWING FIGURES

The following is a brief description of the different plan views as it relates to my invention.

REFERENCE NUMERALS IN DRAWINGS

| | | | |
|---|---|---|---|
| 20 | basic three wing circular body | 21 | forward wing |
| 22 | rear wing | 23R | right wing tip |
| 23L | left wing tip | 24R | right forward wing section |
| 24L | left forward wing section | | |
| 25L | left central wing section | 25R | right central wing section |
| 28R | right vertical stabilizer | 27 | circular platform body |
| 29 | pusher propeller | 28L | left vertical stabilizer |
| 31R | support member | 30 | cockpit |
| 33R | right rudder | 31L | support member |
| 34 | horizontal stabilizer | 33L | left rudder |
| 36 | vertical boundary line | 35 | elevator |
| 37L | left forward aileron | 37R | right forward aileron |
| 38L | left rear aileron | 38R | right rear aileron |
| 50 | scale aircraft | 40 | windshield |
| 51L | left central aileron | 51R | right central aileron |
| 52L | left flat wing | 52R | right flat wing |
| 54 | middle wing section | 53 | circular support structure |
| 56 | spinner | | |
| 57L | tail wheel | 55 | power source |
| 58L | landing gear | 57R | Tail wheel |
| | | 58R | landing gear |

DESCRIPTION OF THE PREFERRED EMBODIMENT AND DRAWINGS

Figure 1:
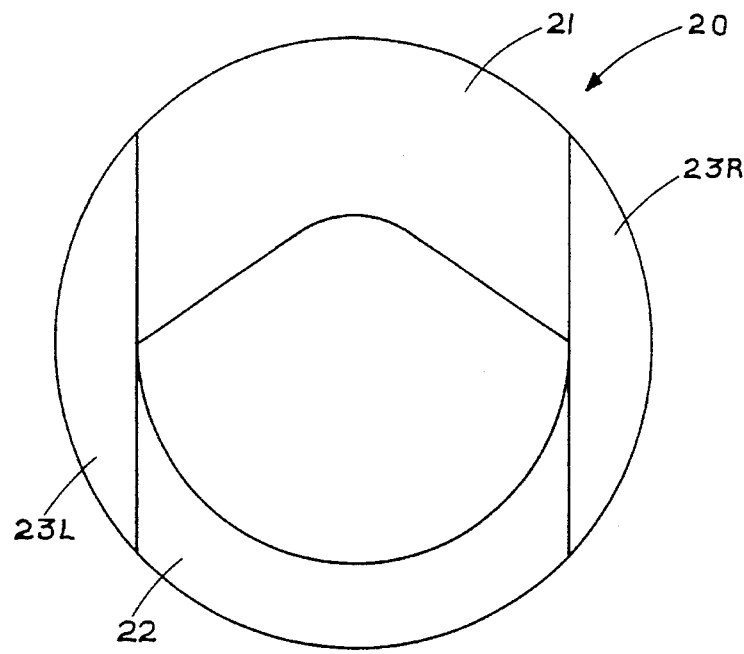
FIG. 1 is a simplified plan view of the three wing sections.

The preferred embodiment of my invention is indicated generally by the drawing in FIG. 1 which exemplifies a basic three wing circular body 20 wherein three different shaped wings combine to form a peripherally circular planform body with a substantial central opening. The three wing sections are a forward wing 21, a rear wing 22, and connecting wing tips 23R and 23L. The trailing edge of the forward wing 21 and the leading edge of the rearwing 22 generally defines the forward, rearward, and lateral edges of the central opening, creating a circular planform body 27 that has both interior and exterior leading and trailing edges. The longitudinal cross sections of the forward wing 21 are generally substantially longer and more consistent in length compared to a longitudinal cross-section taken upon the same line of the rear wing 22. The forward wing is composed of forward wing sections 24R and 24L. The rear wing is composed of a horizontal stabilizer 34 and elevator 35. The full scale version, characterized as a circular planform body 27, is detailed in FIGS. 2, 3, 4, 5, and 6, which generally shows the addition of a pair of parallel vertical stabilizers 28R and 28L positioned about the lateral extremities of a pusher propeller 29 which is attached to the aft portion of a cockpit 30. The cockpit 30, including a windshield 40, is generally located about the central area of the forward wing 21.

Figure 2:
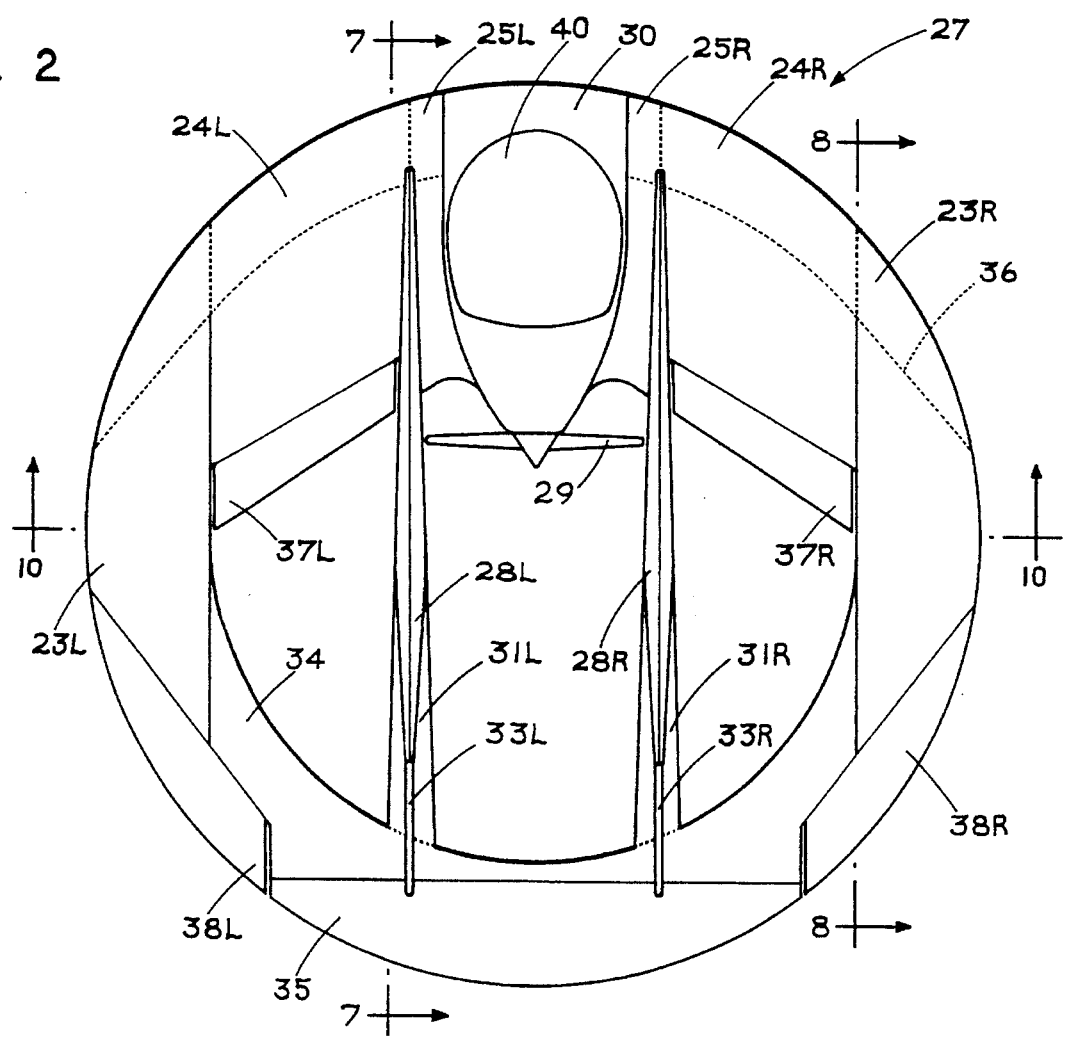
FIG. 2 is a plan view of a full scale aircraft embodying the principles of the invention.
Figure 7:
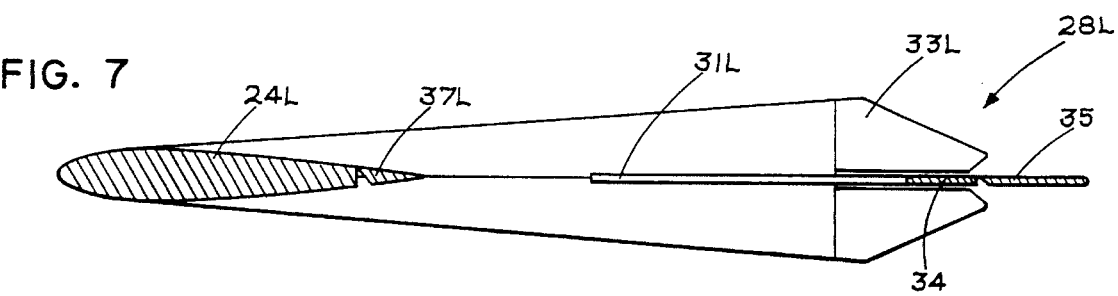
FIG. 7 is a side elevation of the aircraft taken along the line 7—7 of FIG. 2 which shows a vertical stabilizer.
Figure 11:
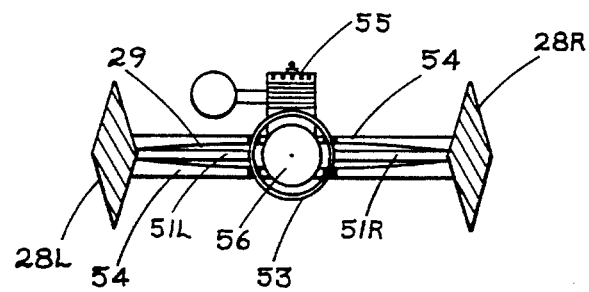
FIG. 11 is a rear elevation of the cross section taken on the line 11—11 of FIG. 10.

The vertical stabilizers 28R and 28L are generally positioned about the left and right extremities of the pusher propeller 29 and extending forwardly and rearwardly, being both parallel and equidistant about the longitudinal axis of the circular planform body 27. The planform view of FIG. 2 illustrates how the upper half of the vertical stabilizer 28R is generally comprised of identical left and right sides, the left side defines the inside contours and the right side defines the outside contours. FIG. 7 illustrates how the upper and lower halves of the vertical stabilizer 28R is generally comprised of identical upper and lower sides. The sides arise forwardly about the thickest vertical section of that particular area of the upper and lower surfaces of the forward wing surface. The sides then extend substantially rearwardly and vertically with the forward contours of the left and right sides connected to the forward wing 21 surfaces. The rearward left and right contours of the rearward half of the vertical stabilizer 28R are connected to a support member 31R. Support member 31R is generally a localized forward extension of the leading edge of the rear wing 22 and is positioned about the common horizontal plane of the circular planform body 27. A longitudinal center line generally bisects the vertical stabilizer 28R into upper and lower halves of equal areas and is generally positioned about the common horizontal plane of circular planform body 27. The central contours of the vertical stabilizer 28R, being that general area about the lateral axis of circular planform body 27, are the thickest horizontal areas thereof. The rearward half of the vertical stabilizer 28R is are connected to a support member 31R which is generally a localized forward extension of the leading edge of the rear wing. The outermost vertical edges generally terminate about a vertical line which extends from the support member 31R to the outermost vertical edges. The vertical line is generally perpendicular to the common horizontal plane and is generally positioned forward of that particular area of the rear wing 22 where the support member 31R is connected to it and also generally represents the longest vertical section of the vertical stabilizer 28R. The vertical line serves as a line of flexure for the forward articulating edge of a rudder 33R. Rudder 33R generally extends rearwardly from the articulating edge, tapering in vertical section to a terminal point about the rear wing 22. The terminal point is generally located about a lateral line of flexure about the articulating forward edge of the elevator 35. The vertical edges of the rudder, above and below the common horizontal center plane, form the trailing edges of vertical stabilizers 28R and 28L. The combined surfaces of the vertical stabilizers 28R and 28L generally forms a diamond shape in lateral cross section of varying dimensions about their respective lengths. An example of this lateral cross section is shown in FIG. 11.

It should now become apparent that the upper shape of the vertical stabilizer 28R and rudder 33R is identical to its lower shape. Furthermore, vertical stabilizer 28L is identical to vertical stabilizer 28R, including support members 31L and 31R, and rudders 33R and 33L. The aft portions of support members 31R and 31L are delineated by a dotted line indicating that their surface areas are connected to and are continuous with the rear wing 22.

Figure 3:
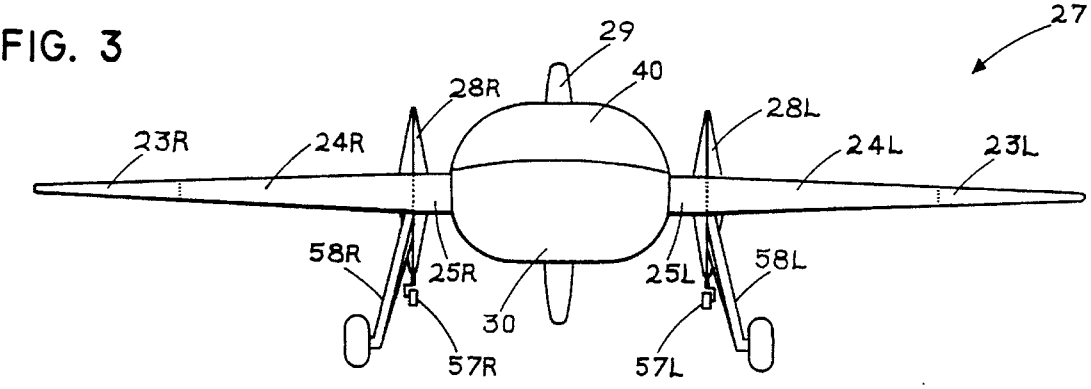
FIG. 3 is a front elevation of the aircraft in FIG. 2.
Figure 4:
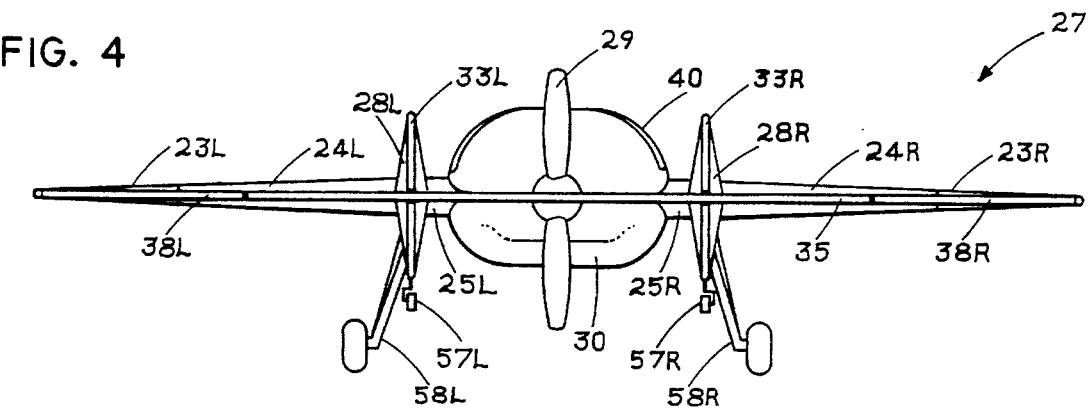
FIG. 4 is a rear elevation of the aircraft in FIG. 2 which shows the propeller and cockpit area overlapped by the horizontal stabilizer.
Figure 5:
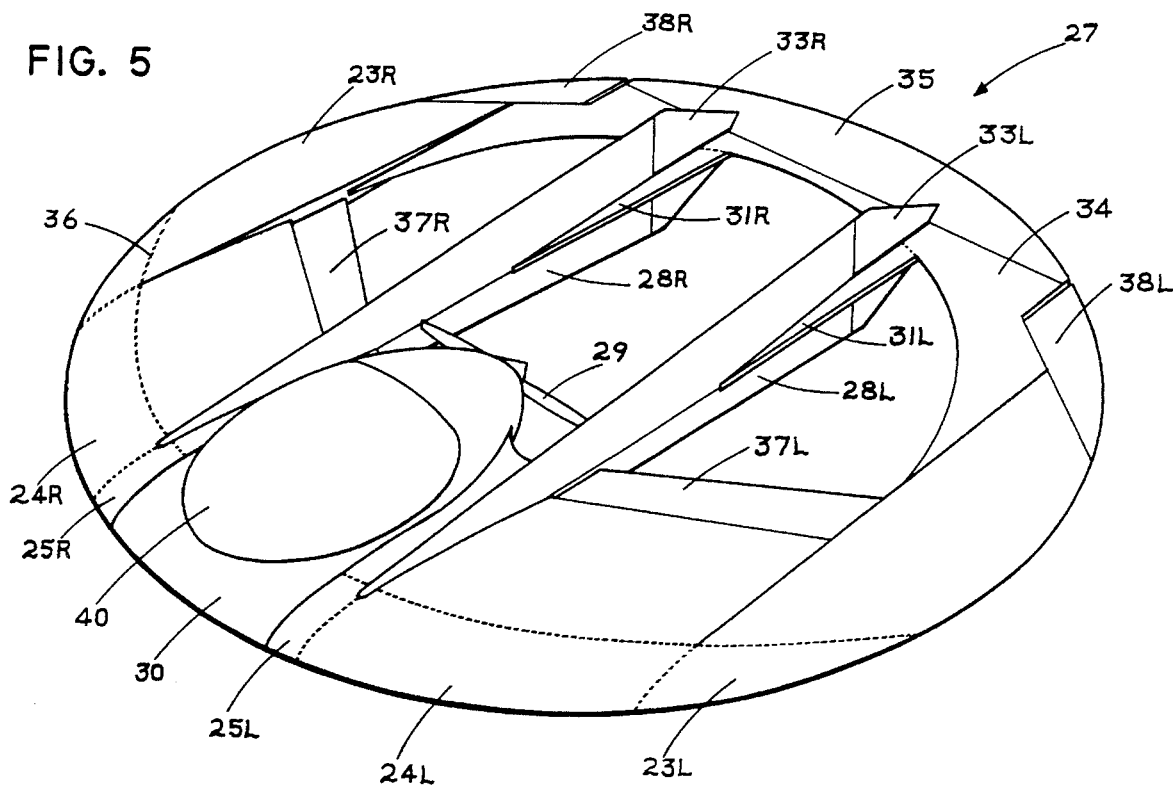
FIG. 5 is a threequarter overhead view of the aircraft in FIG. 2.
Figure 8:
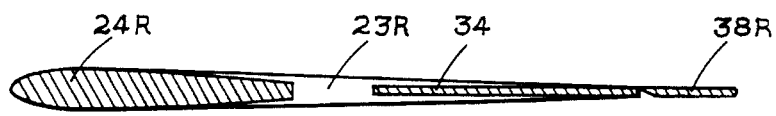
FIG. 8 is a vertical cross section of the aircraft taken on the line 8—8 of FIG. 2.
Figure 9:
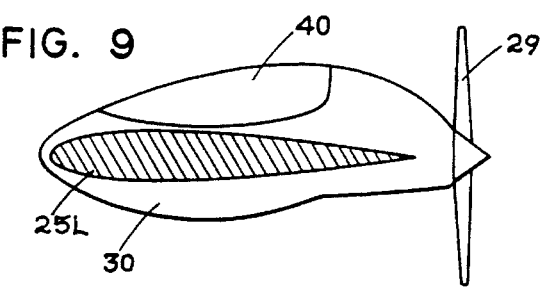
FIG. 9 is a side elevation of the cockpit as shown in FIG. 2.

The three wing sections are generally comprised of conventional cambers of determinate thickness and shape, positioned upon longitudinal lines of reference. The three wing sections are also positioned about the common horizontal plane of circular planform body 27. The leading edge of the circular planform body 27 is comprised of the leading edges of the forward wing 21 and wing tips 23R and 23L. The thickest parts of the forward wing 21 are the central wing sections 25R and 25L as shown in FIG. 3. The laterally adjacent forward wing sections 24R and 24L taper in thickness at a determinate angle as the upper and lower surfaces extend outwardly and rearwardly. The lateral edges of the central opening generally determine the position of the longitudinal line of reference upon which the inside longitudinal vertical edge of the wing tips are positioned with the inside longitudinal vertical edge of the wing tips arising about the leading edge and extending rearwardly and generally terminating about the trailing edges of the circular planform body 27. The outside longitudinal vertical edges of the forward wing 21 interfaces with the forward half of the inside longitudinal vertical edges of wing tips 23R and 23L by structural and surface means. FIG. 8 details the interfacing vertical sections of the forward wing section 24R and the wing tip 23R. The wing tips 23R and 23L generally extend the taper at a determinate angle, outwardly and substantially rearwardly. The taper terminates about the outside edges of wing tips 23R and 23L and the trailing edges thereof.

A vertical boundary line 36 in FIG. 2 represents the thickest sections of the wing cambers of the forward wing 21 and wing tips 23R and 23L. The broken lines extending forward of the vertical boundary line 36 represents a continuous surface about the adjoining wing sections. The vertical boundary line 36 intersects the adjoining vertical edges of the forward wing 21 and wing tips 23R and 23L. This intersecting point is where the adjoining wings begin to separate vertically as they extend rearwardly towards their respective trailing edges.

FIG. 8 also details the interfacing vertical edges of the wing tip 23R and horizontal stabilizer 34. The rear wing 22 generally interfaces with the rear half of the inside longitudinal vertical edge of the wing tip 23R. The wing tip 23R is generally thicker in vertical section than the rear wing 22 at the midpoint of the vertical edge. Both wings extend rearwardly thereof, wherein they terminate at areas of approximately equal vertical thickness. This arrangement also applies to the wing tip 23L.

The leading edge of the rear wing 22 is generally semicircular, arising front the midpoints of the inside longitudinal vertical edges of wing tips 23R and 23L and extending inwardly and rearwardly. The leading edge of the rear wing 22 is generally concentric with the exterior trailing edges of the circular planform body 27. This creates a rear wing that is swept forward about the lateral extremities of the leading edge and trailing edge. The trailing edge of the circular planform body 27 is comprised of the trailing edges of the rear wing 22 and the wing tips 23R and 23L. The rear half of the circular planform body 27 is generally semi-circular with respect to the interior and exterior edges. The rear wing 22 is generally the thinnest, in vertical section, of the three wing sections. It is composed of two substantial surfaces. The horizontal stabilizer 34, which forms the forward surface of the wing including the leading edge of the rear wing 22 and the elevator 35, which forms the rear surface including a substantial amount of the exterior trailing edge of planform body 27. The elevator 35 articulates with the horizontal stabilizer along a substantial lateral line of flexure. In FIG. 2, this articulating line of flexure is positioned about and perpendicular to the terminal ends of the rudders 33R and 33L. Elevator 35 generally produces elevator effects about the rear half of the circular planform body 27. Elevator 35 is generally flanked about its lateral extremities by the inside longitudinal edges of the rear aileron control surfaces.

There are two sets of aileron control surfaces, forward ailerons 37R and 37L and rear ailerons 38R and 38L. The rear aileron control surfaces generally produce aileron effects about the rear half of the circular planform body 27. The rear ailerons 38R and 38L are located about the trailing edge of the wing tips 23R and 23L and the lateral extremities of the rear wing 22. These ailerons are positioned across the aft portions of the interfacing longitudinal vertical edges of the rear wing 22 and the wing tips 23R and 23L. The ailerons articulate forwardly of the lateral trailing edge extremities of circular planform body 27 about predetermined lines of flexure. These flexure lines arise from areas just rearward of the outermost lateral extremities of the wing tips 23R and 23L. The flexure lines extend inwardly and substantially rearward, terminating about the lateral extremities of the rear wing 22. This articulating line of flexure determines the position of the terminal ends of the inside longitudinal vertical edges of the wing tips 23R and 23L and rear wing 22 as shown in circular planform body 27. The articulating line of flexure terminates about a longitudinal line that extends forward from the outside edges of the elevator 35 which defines the inside longitudinal edges of the aileron control surfaces. These longitudinal lines also form the inside edges of the rear ailerons 38R and 38L. The forward aileron control surfaces are located about the interior trailing edges of the circular planform body 27, which are also the trailing edges of the forward wing 21.

The forward ailerons 37R and 37L are located about the trailing edges of the forward wing sections 24R and 24L. Their lateral sides are defined by the inside longitudinal vertical edges of the wing tips 23R and 23L and the outside contours of the vertical stabilizers 28R and 28L, respectively. The rear edges of the ailerons, which are also the trailing edges of the forward wing 21, arise from points about the common horizontal plane of the vertical stabilizers 28R and 28L and extend outwardly and rearwardly, creating a swept back forward wing. The rear edges of the ailerons 37R and 37L terminate about the midpoint of the inside longitudinal vertical edges of the wing tips 23R and 23L. The flexure lines for the articulating edge of the ailerons 37R and 37L are located at a predetermined position forward of the rear edges of the ailerons. These articulating lines of flexure are generally parallel to the rear edges of the ailerons. The forward ailerons 37R and 37L generally produce aileron effects about the forward half of the circular planform body 27.

Figure 6:
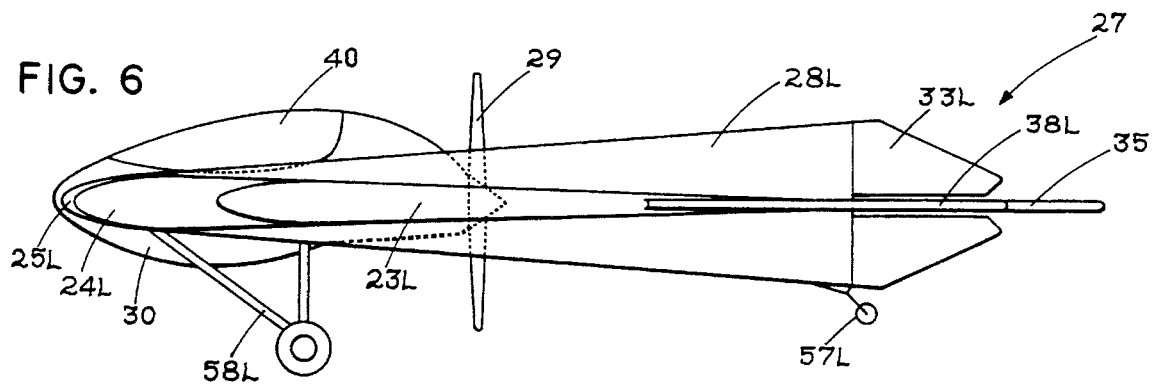
FIG. 6 is a side elevation of the aircraft as shown in FIG. 2 which shows the cockpit and propeller overlapped by a vertical stabilizer which in turn is overlapped by the circular wing.

The cockpit 30 is generally centrally positioned within the forward wing 21 about its central areas. FIGS. 3, 4, 6, and 9, illustrate how the cockpits 30 position is generally bisected by and connected to the central wing sections 24R and 24L. The cockpit 30 generally arises from the leading edge of the forward wing 21 at predetermined points and extends rearwardly above and below the common horizontal plane. The cockpit 30 terminates about the central area of the pusher propeller 29. The propeller 29 is connected forwardly to an appropriate power source (not shown). The power source is housed within that cockpit area between the propeller 29 and the windshield 40. The longitudinal axis of the propeller 29 is located about the longitudinal axis of the circular planform body 27 as shown in FIG. 6.

Figure 10:
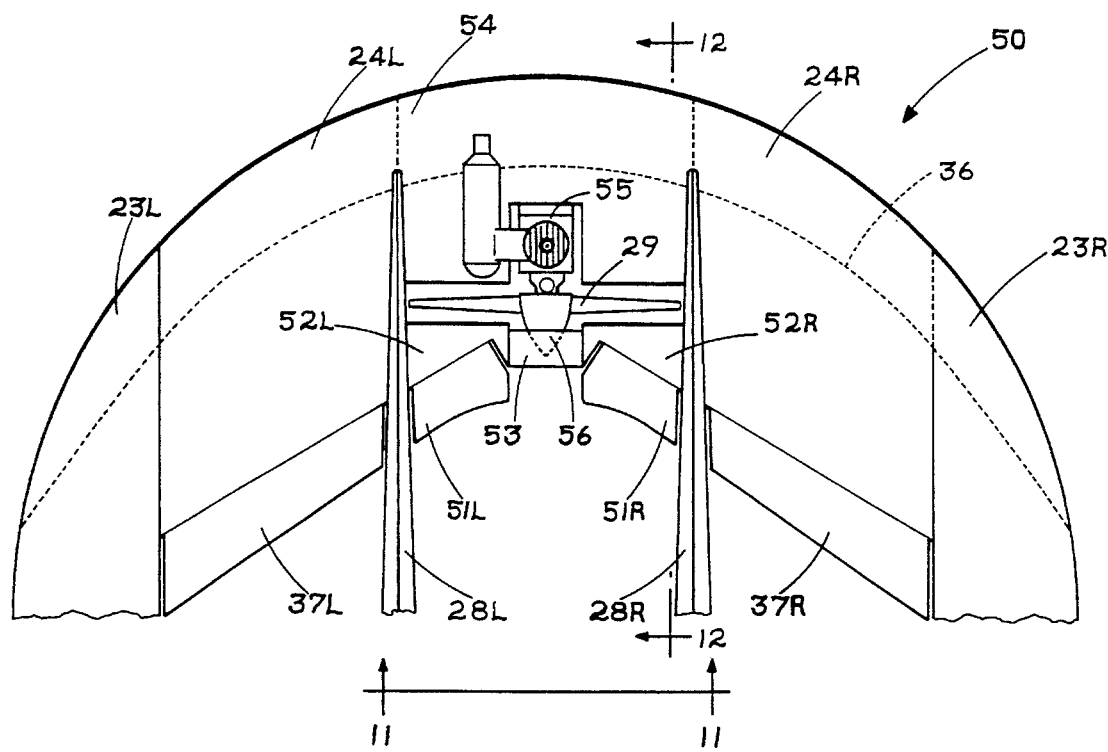
FIG. 10 is a laterally bisected plan view taken along the line 10—10 in FIG. 2 of a scale model aircraft embodying the principles of my invention.
Figure 12:
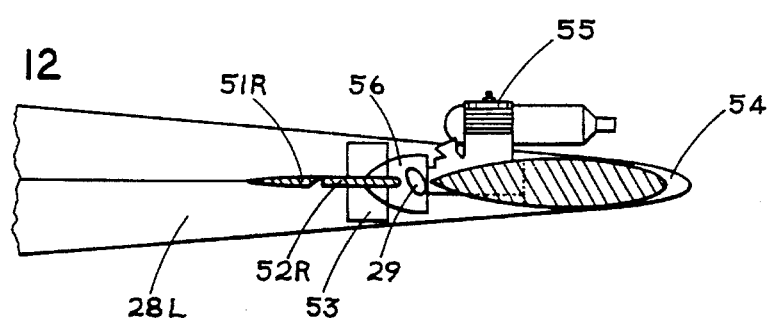
FIG. 12 is a side elevation of the cross section taken of the line 12—12 of FIG. 10.

A scale aircraft 50 version of the circular planform body 27 is detailed in FIGS. 10, 11, and 12. Because a scale model requires no cockpit, it allows the pusher propeller 29 to be placed in a unique position. By moving the propeller 29 forward and placing it in front of the ailerons 37R and 37L, it allows the fore and aft edges of forward ailerons 37R and 37L to be, in effect, extended centrally. These centrally extended control surfaces form central ailerons 51R and 51L and flat wings 52R and 52L, directly behind the propeller 29. Flat wings 52R and 52L form the support structures for the articulating edge of the central ailerons 51R and 51L. The forward edges of the flat wings 52R and 52L are generally adjacent and parallel to the plane of the propeller 29. The flat wings 52R and 52L and central ailerons 51R and 51L arise from the longitudinal center line of the vertical stabilizers 28R and 28L inside contours and extend inward. Flat wings 52R and 52L generally terminate upon predetermined longitudinal lines that are parallel and equidistant from the longitudinal axis. These parallel lines form the inside edges of the flat wings 52R and 52L and provide a space for the placement of a circular support structure 53. FIG. 11 shows how the circular support 53 is connected to the inside edges of the flat wings 51R and 51L and positioned concentrically about the longitudinal axis. The lateral edges of the central ailerons 51R and 51L are defined by the inside contour of the vertical stabilizers 28R and 28L. The forward and rear edges of the central ailerons 51R and 51L are generally central extensions of the forward ailerons 37R and 37L. The central ailerons 51R and 51L generally terminate inwardly about the inside edges of the flat wings 52R and 52L at predetermined points about the longitudinal axis of the circular planform body 27.

Furthermore, in the scale model 50 version, the central wing sections 25R and 25L combine to form a middle wing section 54. Longitudinal cross sections of the middle wing 54 are substantially shorter in length than the adjoining forward wing sections 24R and 24L. FIG. 12 shows a longitudinal cross section taken upon the line 12—12 of FIG. 10. The middle wing section 54 tapers in thickness from the vertical boundary line 36 to the trailing edge thereof. The trailing edge is generally parallel to the plane of the propeller 29 and located about the common horizontal plane. The outside vertical edges of the middle wing section 54 interfaces structurally with the inside vertical edges of the forward wing sections 24R and 24L. The trailing edge of the middle wing section 54 is positioned forward of the leading edge of the flat wings 52R and 52L to allow space for the propeller 29. A space is provided about the central trailing edge area of the middle wing section 54 for a power source 55 to drive the propeller 29. The power source 55 is generally mounted to the middle wing section 54. A spinner 56, which is mounted to the central hub of the propeller 29, extends rearwardly about the longitudinal axis and tapers to point about the longitudinal axis with the aft portion positioned within the central space of the circular support structure 53. The circular support structure 53 allows a rotating engine starting device to contact the spinner 56.

The circular planform body 27 utilizes a tail dragger design. Ground steering is achieved by means of tail wheels 57R and 57L. Landing gear 58R and 58L supports the main body of the aircraft and is structurally connected to the circular planform body 27 about the forward areas of the lower sections of the vertical stabilizers 28R and 28L.

From the description above, a number of advantages of my three wing circular aircraft become evident:

(a) The combined forms of the three wings results in a structurally efficient circular wing.

(b) The vertical stabilizers enhance the structural efficiency of the circular wing by relieving longitudinal stress and flexure about the wing during flight, landing, and the cumulative effects of gravity while on the ground.

(c) The circular circumference of the airfoil increases the safety factor during forced landings or aborted take offs should a wing tip inadvertently touch the ground by allowing the aircraft to roll like a wheel instead of a disastrous cartwheeling motion which would rip the wings off conventional aircraft.

(d) The large wing tips which join the forward and rear wings together work in unison with the vertical stabilizers to reduce the longitudinal stress and flexure of the circular wing.

(e) It should now be observed the circular wing combines the advantages of both a swept back wing, being the forward wing, and a swept forward wing, being the rear wing, which when connected by the large wing tips results in the longitudinal extension of the fore and rear wings, creating a severely swept back wing and a severely swept forward wing, all in the same design.

(f) The forward wing is larger than the rear wing which results in a aerodynamically forward biased circular planform body in that the forward half of the circular planform body has more lift than the rear half which significantly shifts the broadest lateral lifting surfaces forward of the lateral axis and about the center of gravity of the circular planform body thereby generally, but significantly, equalizing the lifting forces about the center of gravity, enabling the circular planform body to maintain a stall free horizontal attitude at very slow forward speeds.

(g) The shape of the planform body allows for a combination of different cambers to achieve the desired performance of the aircraft.

(h) The unique aileron configuration maximizes the amount of area capable of deflecting the airstream, for example, aerobatic maneuvers where a fast roll rate is required.

(i) The unique aileron configuration allows for the mechanical mixing of the rear ailerons with the elevator thereby increasing the angle of attack, resulting in tighter loops in power on maneuvers, slower landing speeds and steeper angles of descent when landing.

(j) The unique aileron configuration deflects the airstream about the forward and rear halves of the circular planform body which reduces the amount of stress that the circular wing is subjected to during rolling maneuvers.

(k) Due to the supporting structure of the vertical stabilizers and the wing tips, the rear wing can be made relatively thin in vertical section, making it the most drag efficient wing.

(l) The vertical form of the vertical stabilizers prevents the mixing of the propeller airstream and the airstream over the outer wing sections which results in a smoother flow of air over the outer wing sections of the rear wing and also concentrates the propeller air stream over the inside vertical surfaces of the aft sections of the vertical stabilizers, including the inside rudder control surfaces and about the central surface areas of the elevator, both above and below the rear wing.

(m) The circular planform body generally has a symmetrical arrangement of vertical stabilizer control surfaces above and below the common horizontal plane, including rudders, an elevator, and a propeller positioned such that the propeller airstream creates equal amounts of pressure upon the upper and lower control surfaces of the elevator and rudders which allows the aircraft to fly inverted and maintain the same flying characteristics as in normal flight.

(n) The circular planform body generally has a cockpit and engine compartment bisected by the forward wing about the left and right sides, with the mass of the cockpit and power source generally the same above and below the common horizontal plane which keeps the longitudinal axis of the rolling maneuver in line with the common horizontal plane, creating a smooth spiral flow of mass about a longitudinal axis when flying.

(o) The pusher propeller design allows for an unobstructed forward view from the cockpit.

(p) The pusher propeller design results in a quieter cockpit in that the power source is located rearward.

(q) The pusher propeller design places the rudders and elevator surfaces closer to the propeller thrust which increases the efficiency of the control surfaces.

(r) Ground steering is safer in that the propeller is centrally located, reducing the possibility of it coming in contact with a foreign object.

(s) The position of the propeller between the vertical stabilizers provides a convenient structural arrangement for the placement of additional aileron control surfaces directly behind the propeller which increases the efficiency of the aileron performance.

(t) The aileron control surfaces behind the propeller could also be controlled independently such that both left and right central ailerons function in unison with each other as a positive or negative lifting device which when operatively linked with the elevator, can result in tighter loops, steeper angles of attack and slower landings.

(u) The forward ailerons could additionally be controlled independently as positive or negative lifting surfaces which can result in tighter loops, steeper angles of attack and slower landings.

Operational Description

The central opening of the circular planform body 27, being of a determinate size and shape, displaces the lifting forces away from the center while also creating more wing area about the forward half of the circular planform body 27 which places the longest and most continuous lateral lifting surfaces about the center of gravity of the circular planform body 27 which in turn allows the mass of the cockpit 30 and the propeller 29, along with its accompanying power source, to be positioned about the center of gravity such that the cockpit 30 is just aft of the leading edge of the circular planform body 27 whereby the lifting forces are generally, but significantly, distributed with greater uniformity about the center of gravity which allows for extremely slow speeds without stalling and high angles of descent while maintaining lateral control during landing approaches with or without power which, when combined with the forward and rear aileron control surfaces unique configuration, allows for a substantial amount of lateral control during slow flight by deflecting the air stream about the forward and rear halves, and about the interior and exterior trailing edges of the circular planform body 27. The circular planform body is propelled forward by the propeller 29 such that the airstream from the propeller is directed over the central elevator 35 areas and the inside surfaces of the rudders 33R and 33L. The vertical stabilizers 28R and 28L generally contain the lateral boundaries of the propeller airstream in addition to functioning as slip stream barriers, preventing air from the propeller airstream from disturbing the flow of air over the outer sections of the rear wing 22. The three different wing sections form the lifting body of the aircraft. The rear ailerons 38R and 38L are capable of functioning independently as additional elevator control surfaces. The forward ailerons 37R and 38L are also capable of functioning independently as control surfaces. The central ailerons 51R and 51L allow lateral control of the aircraft when it is performing a vertical hover and in general increases the responsiveness of the aileron functions. The central ailerons 51R and 51L are additionally capable of functioning independently as a positive lifting surface as when both central ailerons are in the down position or a negative lifting surface as when both central ailerons are in the up position which generally allows for tighter loops and slower landings.

Summary, Ramifications, and Scope

Accordingly, the reader will see that the circular planform body is an aerobatic aircraft capable of high speeds, while also exhibiting a substantial amount of stability ar slow speeds. In addition, the aircraft is structurally efficient which allows for lighter construction techniques and is generally safer in that the propeller is centrally located. The circular circumference also increases the safety of the aircraft during forced landings should a wing contact the ground by literally rolling like a wheel to absorb the impact. Furthermore, the pusher propeller and cockpit configuration provide for a quieter cockpit with an unobstructed forward view.

Additional Ramifications

Although the present description contains many specifications, it should not be construed as limiting the scope of the invention but as a basic version of some of the preferred embodiments of this invention. For example, it may be necessary to extend the cockpit forward, breaking the circular circumference; the cockpit could be extended rearward, placing the propeller closer to the aft control surfaces; the propeller and power source could be mounted forward of the cockpit; the elevator and rear ailerons could be combined such that there are only two control surfaces about the trailing edge which are separated about a central area; the concentric lines of the planform body could become more angular and still maintain the same relationship to its respective parts; the vertical stabilizers could be completely eliminated; the vertical stabilizers could be replaced by vertical stabilizers positioned about the inside wing tip edges; the symmetry of the vertical stabilizers could be altered such that the left, right, upper and lower surfaces of each stabilizer are no longer identical. The vertical stabilizers could by replaced by a singular fuselage, centrally located with a suitable power source mounted forward or aft, including jet engines; dihedral could be built into the circular wing for more stability; the cockpit and/or propeller could be positioned above or below the horizontal plane; the power source could rotate such that additional positive or negative lifting forces could be applied to the aircraft; ground steering could by achieved by a tricycle landing gear positioned about the cockpit area or positioned with a broader span such that the wheels are located about the circumference of the aircraft; the basic three wing circular form could be fitted to fly as a kite and the aircraft could also be constructed as an ultralight.

Thus, the scope of the invention should be determined by the appended claims and their legal equivalents, rather than by the examples given.

I claim:

1. In an aircraft: a generally forward biased, peripherally circular planform body comprised of a swept back forward wing, a swept forward rear wing, and a pair of connecting wing tips which are generally comprised of wing cambers positioned upon longitudinal lines of reference which combine to form a substantial central opening as generally defined by the trailing edge of said forward wing and the leading edge of said rear wiring with the outside longitudinal vertical edges of said forward and rear wings being generally parallel to the longitudinal inside vertical edges of said wing tips and to the longitudinal axis of said circular planform body, with the outside longitudinal vertical edges of said forward and rear wings generally being of equal longitudinal length and interfacing by structural and surface means with the forward and rear halves of the inside longitudinal vertical edges of said wing tips, with the longitudinal cross sections of said forward wing being generally substantially longer and more consistent in length in comparison to same of said rear wing with said rear wing generally becoming progressively more swept forward about the interior and exterior lateral extremities with said circular planform body further characterized as having both interior and exterior leading and trailing edges respectively, the improvement wherein said circular planform body is significantly aerodynamically forward biased in that the forward half of said circular planform body has more wing area and generally more lift than the rear half which significantly shifts the broadest lateral lifting surfaces forward of the lateral axis and about the center of gravity of said circular planform body thereby generally, equalizing the lifting forces about said center of gravity, enabling said circular planform body to maintain a horizontal attitude at very slow forward speeds.

2. In an aircraft as in claim 1 wherein aileron control surfaces of a determinate size and shape are generally located about the trailing edges of said forward wing and the lateral trailing edge extremities of said circular planform body, whereby aileron control surfaces about the interior and exterior trailing edges further maximizes the amount of airstream deflection possible for lateral control.

3. In an aircraft: a generally forward biased, peripherally circular planform body comprised of a swept back forward wing, a swept forward rear wing, and a pair of connecting wing tips which combine to form a substantial central opening as generally defined by the trailing edge of said forward wing and the leading edge of said rear wing with the outside longitudinal vertical edges of said forward and rear wings being generally parallel to the longitudinal inside vertical edges of said wing tips and to the longitudinal axis of said circular planform body, with the outside longitudinal vertical edges of said forward and rear wings generally being of equal longitudinal length and interfacing by structural and surface means with the forward and rear halves of the inside longitudinal vertical edges of said wing tips, with the longitudinal cross sections of said forward wing being generally substantially longer and more consistent in length in comparison to same of said rear wing with said rear wing generally becoming progressively more swept forward about the interior and exterior lateral extremities with said circular planform body further characterized as having both interior and exterior leading and trailing edges respectively, having a pusher propeller for thrust, positioned generally just aft of said forward wing with the axis of said pusher propeller positioned about the longitudinal axis of said circular planform body and connected by structural and mechanical means to the aft portion of a cockpit which is located about the central area of said forward wing whereby said propeller is generally flanked about its lateral extremities by a pair of parallel vertical stabilizers being substantially longitudinal in length, and laterally equidistant and parallel to the longitudinal axis and being substantially vertical in form as compared to the lateral thickness of same with said vertical stabilizers extending across said central opening with the common horizontal plane of the three wing sections generally bisecting said vertical stabilizers about their respective longitudinal lengths whereby said vertical stabilizers are connected, by structural means, to said forward and rear wings about the common horizontal plane with said vertical stabilizers being generally short in vertical cross section about said forward wing and extending perpendicular to said circular planform body, above and below and rearwardly, with the sides and the vertical edges of said vertical stabilizers being generally continuous about their lengths, with said vertical stabilizers significantly larger in vertical cross section about predetermined points above and below said rear wing, wherein said vertical stabilizers extend rearwardly and taper to points about said rear wing with control surfaces of a determinate size and shape, respective of their predetermined functions, being located about the trailing edges of said forward and rear wings, wingtips, and vertical stabilizers, the improvement wherein said circular planform body is significantly aerodynamically forward biased in that the forward half of said circular planform body has more wing area and generally more lift than the rear half which significantly shifts the broadest lateral lifting surfaces forward of the lateral axis and about the center of gravity of said circular planform body thereby generally, equalizing the lifting forces about said center of gravity, enabling said circular planform body to maintain a horizontal attitude at very slow forward speeds whereby aileron control surfaces about the interior and exterior trailing edges further maximizes the amount of airstream deflection possible for lateral control with the mass of said cockpit and a power source, including said propeller, being generally bisected by the common horizontal plane of said circular planform body and vertical stabilizers, which results in a smooth spiral flow of mass about the longitudinal axis during rolling maneuvers, with the vertical form of said vertical stabilizers containing the lateral boundaries of the airstream from said pusher propeller, directing it rearwardly over said control surfaces located about the trailing edges of said vertical stabilizers and rear wing whereby rudder and elevator effects are produced above, below, and generally about the trailing edge of said circular planform body, in addition said vertical stabilizers function as slip stream barriers and prevents air from the propeller airstream from disturbing the flow of air over the outer sections of said rear wing resulting in a smoother flow of air over said rear wing, with said circular planform body being further characterized as structurally efficient in that not only are said forward and rear wings and wing tips connected to each other about the common horizontal plane, said vertical stabilizers also relieve stress and flexure about the circular planform body during flight, landing, and the cumulative effects of gravity while on the ground.

4. In a aircraft as in claim 3 wherein all wing sections of the forward wing and rear wings and wing tips generally have predetermined cambers that arise and terminate about longitudinal lines of reference, relative to the forward and rear wings' and wing tips' leading and trailing edges respectively.

5. In an aircraft as in claim 3 wherein said circular planform body is generally thickest in vertical section about the longitudinal axis of said forward wing and generally tapering laterally and rearwardly in vertical cross section, terminating about the outside edges and trailing edges of said wing tips.

6. In a aircraft as in claim 5 wherein the thickest sections of the wing cambers of said forward wing and wing tips intersect with the adjoining longitudinal vertical edges of said forward wing and wing tips forming an intersecting point wherein said forward wing and wing tips form a continuous surface forward of the intersecting point, the intersecting point also represents where the adjoining vertical edges of said forward wing and wing tips begin to separate vertically as they extend rearwardly towards their respective trailing edges.

7. In an aircraft as in claim 3 wherein the leading edge of said rear wing is generally concentric with the trailing edge of said circular planform body, with the rear half of said circular planform body generally being semi circular with respect to the interior and exterior edges thereof.

8. In an aircraft as in claim 3 wherein said rear wing is relatively thin in vertical section as compared to the vertical section of the forward wing of said circular planform body.

9. In an aircraft as in claim 3 wherein said circular planform body generally has aileron control surfaces located about the interior trailing edges of said circular planform body which is, more specifically, the trailing edge of said forward wing, with the lateral sides of said aileron control surfaces generally defined by the inside longitudinal vertical edges of said wing tips and the outside contours of said vertical stabilizers, respectively, with the rear edges of said aileron control surfaces arising from points about the common horizontal plane of said vertical stabilizers and extending outwardly and rearwardly, generally terminating about the midpoint of the inside longitudinal vertical edges of said wing tips with the flexure lines of the articulating edge of said aileron control surfaces being located at a predetermined position forward of the rear edges of said aileron control surfaces and generally being parallel to the rear edges of said aileron control surfaces which operate by mechanical means, generally producing aileron effects about the forward half of said circular planform body.

10. In an aircraft as in claim 9 wherein said pusher propeller is moved forward, generally placing it in front of said aileron control surfaces which allows them to be, in effect, extended centrally, placing additional aileron control surfaces generally directly behind said propeller, thereby producing, by operative mechanical means, aileron effects about the longitudinal axis of said circular planform body.

11. In an aircraft as in claim 3 wherein said circular planform body generally has aileron control surfaces located about the exterior trailing edges of said circular planform body which is, more specifically, the trailing edges of said wing tips and the lateral trailing edge extremities of said rear wing with said aileron control surfaces positioned across the aft portions of the interfacing longitudinal vertical edges of said rear wing and wing tips whereby said aileron control surfaces articulate forwardly of the lateral extremities of said circular planform body about predetermined lines of flexure with the flexure lines arising from areas just rearward of the outermost lateral extremities of said wing tips extending inwardly and substantially rearward, terminating about the lateral extremities of said rear wing whereby the articulating line of flexure determines the position of the terminal ends of the interfacing longitudinal vertical edges of said wing tips and rear wing with the articulating line of flexure terminating about a longitudinal line that extends forward from the outside edges of an elevator and defines the inside longitudinal edge of said aileron control surfaces wherein said aileron control surfaces operate by mechanical means, generally producing aileron effects about the rear half of said circular planform body.

12. In an aircraft as in claim 11 wherein said rear wing is generally composed of two substantial surfaces, a horizontal stabilizer which forms the forward surface of said rear wing, including the leading edge thereof, and said elevator which forms the rear surface including a substantial amount of the trailing edge of said rear wing and is generally flanked about its lateral extremities by said aileron control surfaces inside longitudinal edges and articulates with said horizontal stabilizer along a substantial lateral line of flexure with the articulating line of flexure generally positioned about and perpendicular to the terminal ends of said vertical stabilizers thereby producing, by operative mechanical means, elevator effects about the rear half of said circular planform body, more specifically, that area about the trailing edge of said rear wing.

13. In an aircraft: a generally forward biased, peripherally circular planform body having a substantial central opening therein, which separates said circular planform body into a forward wing, a rear wing, and a pair of wing tips as determined by the lateral edges of said central opening whereby the lateral edges of said central opening generally determines the position of the longitudinal line upon which the inside longitudinal vertical edge of said wing tips is positioned and also determines the lateral extremities of said forward wing and rearwing, with the longitudinal line arising about the leading edge of said circular planform body and extending rearwardly, generally terminating about the trailing edge of said circular planform body with the outside longitudinal vertical edges of said forward wing interfacing, by structural and surface means, with the generally forward half, of the inside longitudinal vertical edge of said wing tips while the rear half of said wing tips inside longitudinal vertical edge interfaces, by structural and surface means, with the outside longitudinal vertical edge of said rear wing with said forward wing being generally longer in longitudinal cross section than said rear wing while the outside longitudinal vertical edges of said forward and rear wings generally, are of equal longitudinal cross sectional length with the leading and trailing edges of said rear wing generally being swept forward about their lateral extremities, forming a generally swept forward wing in total while the leading and trailing edges of said forward wing are generally swept back about their lateral extremities forming a swept back wing in total, whereby said forward wing and said rear wing are connected to each other by means of said wing tips and a pair of centrally located vertical stabilizers with said vertical stabilizers being substantially longitudinal in form and extending longitudinally across said central opening with the longitudinal center line of said vertical stabilizers generally bisecting the vertical stabilizers into upper and lower halves wherein the longitudinal center line is generally located about the common horizontal plane of said circular planform body with the vertical edges of said vertical stabilizers arising generally from the thickest section about the upper and lower surfaces of said forward wing with said vertical edges generally extending rearwardly, above and below, and perpendicular to the common horizontal plane of said circular planform body with said vertical edges reaching a maximum predetermined distance from the common horizontal plane at predetermined points above and below the general area about the leading edge of said rear wing which generally determines the position of a substantial vertical articulating line of flexure for the articulating edge of a rudder control surface which generally comprises the trailing edges of said vertical stabilizers wherein the vertical edges of said rudder control surfaces generally taper to points about said rear wing with said vertical stabilizers generally being both parallel and equidistant about the longitudinal axis of said circular planform body wherein a pusher propeller is positioned between said vertical stabilizers with the axis of said pusher propeller being positioned about the longitudinal axis and the common horizontal plane of said circular planform body wherein said pusher propeller is generally connected forwardly to a power source and cockpit by structural and mechanical means, with said cockpit and power source positioned about and bisected by the longitudinal axis of said circular planform body such that the mass of said cockpit and power source is the same above and below the common horizontal plane with the cockpit generally bisected by and connected to said forward wing wherein said vertical stabilizers additionally direct the airstream from said pusher propeller over a combination of rearwardly placed control surfaces with said control surfaces being, impart, the inside vertical surfaces about the aft sections of said vertical stabilizers wherein rudder effects are produced, articulating about predetermined lines of flexure whereby complimentary rudder effects are produced, by operative mechanical means, in the aft sections of both of said vertical stabilizers, above and below said rear wing, with said rear wing being comprised of two substantial surfaces, a horizontal stabilizer comprising the forward surface areas, and an elevator control surface comprising the rear surface areas, with said horizontal stabilizer forming the leading edge of said rear wing and said elevator comprising a substantial amount of the trailing edge of said rear wing, with said elevator generally articulating about predetermined lateral lines of flexure with said lines of flexure, in top planform view, being generally perpendicular to and located about the terminal point of said vertical stabilizers and generally producing elevator effects, by operative mechanical means, about the trailing edge of said planform body with an additional pair of control surfaces being rear aileron control surfaces, generally located about the trailing edge of said wing tips and the lateral extremities of said rear wing, with said rear aileron control surfaces generally extending across the terminal end of said wing tips inside longitudinal vertical edge wherein said rear aileron control surfaces become part of the trailing edge of said rear wing and the trailing edge of said wing tips, articulating forwardly about predetermined lines of flexure with said lines of flexure generally arising from areas just rearward of the outermost lateral extremities of said wing tips trailing edge and extending inwardly and substantially rearward, terminating about the lateral extremities of said rear wing where said rear aileron control surfaces, by operative mechanical means, generally produces aileron effects about the lateral extremities of the trailing edge of said circular planform body with an additional pair of control surfaces being forward aileron control surfaces, generally located about the trailing edges of said forward wing, articulating forwardly about predetermined lines of flexure, with said lines of flexure being generally parallel to the trailing edge of said forward wing with the inside lateral edges of said forward aileron control surfaces arising from and defined by the outside contours about the forward areas of said vertical stabilizers, generally extending horizontally rearward and substantially outward, terminating about the midpoint of said wing tips inside longitudinal vertical edges which generally defines the lateral sides of said forward aileron control surfaces, generally producing aileron effects about the forward half of said circular planform body, by operative mechanical means, the improvement wherein said circular planform body is comprised of a substantial central opening of a determinate size and shape, thereby displacing the lifting forces away from the center while also creating more wing area about the forward half of said circular planform body which places the longest and most continuous lateral lifting surfaces about the center of gravity of said circular planform body which in turn allows the mass of said cockpit and said propeller, along with its accompanying power source, to be positioned about said center of gravity such that the cockpit is just art of the leading edge of said circular planform body whereby the lifting forces are distributed with greater uniformity about said center of gravity which allows for extremely slow speeds without stalling and high angles of descent while maintaining lateral control during landing approaches with or with out power which, when combined with said forward and rear aileron control surfaces unique configuration, allows for a substantial amount of lateral control during slow flight by deflecting the airstream about the forward and rear halves, and about the interior and exterior trailing edges of said circular planform body whereby having the mass of the cockpit and the power source being generally bisected by the common horizontal plane of said circular planform body allows for fast roll rates with a smooth spiral flow of mass about the longitudinal axis of said circular planform body during power on maneuvers which when combined with the generally symmetrical arrangement of said vertical stabilizers, including said rudder control surfaces, and said elevator control surfaces, it allows the circular planform body to fly inverted and still maintain the same flying characteristics as in normal flight with said vertical stabilizers being further characterized as airstream barriers in that the vertical form of said vertical stabilizers prevents the mixing of the airstream over the outer wing sections of said rear wing resulting in a smooth flow of air over the outerwing sections of said rearwing wherein said elevator control surface generally receives the airstream from outside said vertical stabilizers about said elevator control surfaces lateral extremities and receives the propeller airstream about said elevator control surfaces central surface areas between said vertical stabilizers with said rear aileron control surfaces capable of functioning independently of said forward aileron control surfaces as additional elevator control surfaces with said forward aileron control surfaces also capable of functioning independently as a lifting device as when both of said forward aileron control surfaces are in the down position, allowing for tighter loops or slower landings in addition to being structurally efficient in that the three wing sections are structurally connected to each other and generally continuous about the central opening wherein said vertical stabilizers and said wing tips combine to enhance the structural efficiency by reducing longitudinal stress and flexure about the forward and rear halves of said circular planform body.

14. In an aircraft as in claim 13 wherein said forward wing and said wing tips, having common adjoining longitudinal vertical edges with predetermined cambers about their respective longitudinal lengths are continuous about their respective adjoining forward areas and leading edges, generally having specific upper and lower surface areas being the thickest vertical section of said cambers which determines the point about said common adjoining edges wherein the upper and lower surfaces about said wing tips inside longitudinal vertical edge and the adjoining surfaces of the forward wing begin to vertically separate as the surfaces extend rearwardly, tapering toward their respective trailing edges.

15. In an aircraft as in claim 13 wherein said forward wing is thickest about the longitudinal axis of said circular planform body with said forward wing generally tapering in vertical thickness at a predetermined angle about the common horizontal plane as it extends laterally and rearwardly where said wing tips generally continue the taper, at a determinate angle, terminating about the outside edges and trailing edges of said wing tips.

16. In an aircraft as in claim 13 wherein the leading edge of said rear wing is generally semi circular and concentric with the exterior trailing edge and the rear half of said circular planform body, whereby all cambers about the rear half arise from longitudinal lines.

17. In an aircraft as in claim 13 wherein said vertical stabilizers, in top planform view, are substantially longitudinal in shape, with the central contours being that area about the lateral axis of said circular planform body and the thickest horizontal sections of said vertical stabilizers, tapering both forwardly and rearwardly as characterized by a continuous contour about the common horizontal plane of said circular planform body, with the forward upper and lower surfaces of said vertical stabilizers generally tapering about all its sides and edges terminating about and connected to said forward wing with the rearward upper and lower surfaces of said vertical stabilizers tapering about their left and right sides with the vertical edges of said rear upper and lower surfaces extending vertically whereby the contours, the left and right sides, and the vertical edges of said vertical stabilizers terminate about said vertical articulating line of flexure, above and below said rear wing.

18. In an aircraft as in claim 17 wherein the contours of the rearward half of said vertical stabilizers are connected to a support member which is generally a localized forward extension of the leading edge of said rear wing which allows said vertical articulating line of flexure to be positioned forward of said rear wing.

19. In an aircraft as in claim 13 wherein said pusher propeller is generally positioned forward of said forward aileron control surfaces which allows the fore and aft edges of said forward aileron control surfaces to be in effect extended centrally, by structural means, placing addition aileron control surfaces, characterized as central ailerons, directly behind said pusher propeller whereby said central ailerons arise from the longitudinal center line about the inside contours of said vertical stabilizers with the inside edges of said central ailerons terminating inwardly about predetermined points about the longitudinal axis of said circular planform body with the outside edges of said central ailerons defined by the inside contours of said vertical stabilizers with said central ailerons being mechanically linked to said forward aileron control surfaces thereby producing aileron effects about the longitudinal axis of said circular planform body and can also, by operative mechanical means, function independently of said forward aileron control surfaces such that when both of said central ailerons are placed in the down position a positive lifting effect occurs or when both of said central ailerons are placed in the up position a negative lifting effect occurs.

20. In an aircraft as in claim 19 wherein said central ailerons articulate forwardly with a support structure, characterized as flat wings, that arise from the longitudinal center line about the inside contours of said vertical stabilizers with the forward edges of said flat wing support structure being substantially adjacent and parallel to the plane of said pusher propeller with said support structure generally terminating inwardly upon predetermined longitudinal lines that are parallel and equidistant from the longitudinal axis whereby a circular support structure is connected to the inside edges of said flat wing support structure and is positioned concentrically about the longitudinal axis of said pusher propeller.

\* \* \* \* \*